United States Patent
Shouho et al.

(10) Patent No.: US 11,019,289 B2
(45) Date of Patent: *May 25, 2021

(54) IMAGING DEVICE

(71) Applicant: PANASONIC INTELLECTUAL PROPERTY MANAGEMENT CO., LTD., Osaka (JP)

(72) Inventors: Makoto Shouho, Osaka (JP); Masaaki Yanagida, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,030

(22) Filed: Sep. 18, 2019

(65) Prior Publication Data
US 2020/0014867 A1    Jan. 9, 2020

Related U.S. Application Data

(63) Continuation of application No. 15/986,478, filed on May 22, 2018, now Pat. No. 10,462,396.

(30) Foreign Application Priority Data

Jun. 1, 2017   (JP) ................. 2017-109217

(51) Int. Cl.
*H04N 5/357* (2011.01)
*H04N 5/378* (2011.01)
(Continued)

(52) U.S. Cl.
CPC ......... *H04N 5/3575* (2013.01); *H04N 5/3598* (2013.01); *H04N 5/35509* (2013.01); *H04N 5/378* (2013.01)

(58) Field of Classification Search
CPC ............ H04N 5/35509; H04N 5/3575; H04N 5/3598; H04N 5/378
See application file for complete search history.

(56) References Cited

U.S. PATENT DOCUMENTS 5,343,089 A * 8/1994 Itakura ................. G11C 27/026
  327/94
10,462,396 B2 * 10/2019 Shouho .............. H04N 5/35509
(Continued)

FOREIGN PATENT DOCUMENTS

| JP | 2000-287131 | 10/2000 |
| JP | 2008-017011 | 1/2008 |

(Continued)

OTHER PUBLICATIONS

Notice of Allowance issued in U.S. Appl. No. 15/986,478, dated Jun. 19, 2019.

*Primary Examiner* — Daniel M Pasiewicz
(74) *Attorney, Agent, or Firm* — McDermott Will and Emery LLP

(57) ABSTRACT

An imaging device includes: a pixel including a photoelectric converter that generates signal charge by photoelectric conversion, and a charge accumulation region that accumulates the signal charge, the pixel being configured to output a signal corresponding to a voltage of the charge accumulation region; a signal line electrically connected to the pixel, the signal being transmitted through the signal line; a first switch that is electrically connected to the signal line and that has input-output characteristics in which an output is linear with respect to an input up to a clipping voltage and the output is clipped at the clipping voltage with respect to the input exceeding the clipping voltage; and a second switch that is electrically connected to the signal line and (Continued)

that has input-output characteristics in which an output is linear with respect to an input.

20 Claims, 13 Drawing Sheets

(51) Int. Cl.
*H04N 5/359* (2011.01)
*H04N 5/355* (2011.01)

(56) References Cited

U.S. PATENT DOCUMENTS

| | | |
|---|---|---|
| 2008/0054320 A1 | 3/2008 | Solhusvik et al. |
| 2014/0139713 A1 | 5/2014 | Gomi et al. |
| 2014/0312207 A1 | 10/2014 | Ikeda et al. |
| 2018/0098005 A1 | 4/2018 | Hanzawa |

FOREIGN PATENT DOCUMENTS

| | | |
|---|---|---|
| JP | 2008-042674 | 2/2008 |
| JP | 2008-042675 | 2/2008 |
| JP | 2014-212423 | 11/2014 |

\* cited by examiner

IMAGING DEVICE

CROSS-REFERENCE OF RELATED APPLICATIONS

This application a continuation of U.S. patent application Ser. No. 15/986,478, filed on May 22, 2018, now U.S. Pat. No. 10,462,396, which in turn claims the benefit of Japanese Application No. 2017-109217, filed on Jun. 1, 2017, the entire disclosures of which Applications are incorporated by reference herein.

BACKGROUND

1. Technical Field

The present disclosure relates to an imaging device.

2. Description of the Related Art

An imaging device is known that sequentially scans and outputs a reference signal at the time of reset and a pixel signal corresponding to an amount of received light. A difference between both signals is obtained, whereby a true pixel signal can be obtained. This processing is what is called correlated double sampling (CDS).

When an object with high luminance is imaged, a large amount of signal charge is also generated by light received during a short period of time immediately after the reset, which fluctuates the reference signal in some cases. The pixel signal may accordingly be saturated at the same time. When a difference between the fluctuated reference signal and the saturated pixel signal is obtained, the true pixel signal may be a value close to zero. As a result, a blackening (black crush) is generated in an area of the imaged object with the high luminance on the image. Such a blackening occurs frequently, particularly in a state where a light receiving surface of the imaging device is continuously exposed to light. This phenomenon conspicuously emerges under control by an electronic shutter or in continuous photographing.

Japanese Unexamined Patent Application Publication No. 2008-42674 discloses an imaging device including a clip transistor that has a function to clip signal potential at a pixel output line. The clip transistor is electrically connected with an inverting input terminal of an operational amplifier. When reading out a reset signal, use of the clip transistor can prevent potential of an output terminal of the operational amplifier from rising to a certain level or higher.

SUMMARY

It has been demanded that a simple circuit configuration is used to suppress a phenomenon of a blackening.

One non-limiting and exemplary embodiment provides an imaging device below.

In one general aspect, the techniques disclosed here feature an imaging device including: a pixel including a photoelectric converter that generates signal charge by photoelectric conversion, and a charge accumulation region that accumulates the signal charge, the pixel being configured to output a signal corresponding to a voltage of the charge accumulation region; a signal line electrically connected to the pixel, the signal being transmitted through the signal line; a first switch that is electrically connected to the signal line and that has input-output characteristics in which an output is linear with respect to an input up to a clipping voltage and the output is clipped at the clipping voltage with respect to the input exceeding the clipping voltage; and a second switch that is electrically connected to the signal line and that has input-output characteristics in which an output is linear with respect to an input.

It should be noted that general or specific embodiments may be implemented as an element, a device, a module, a system, an integrated circuit, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
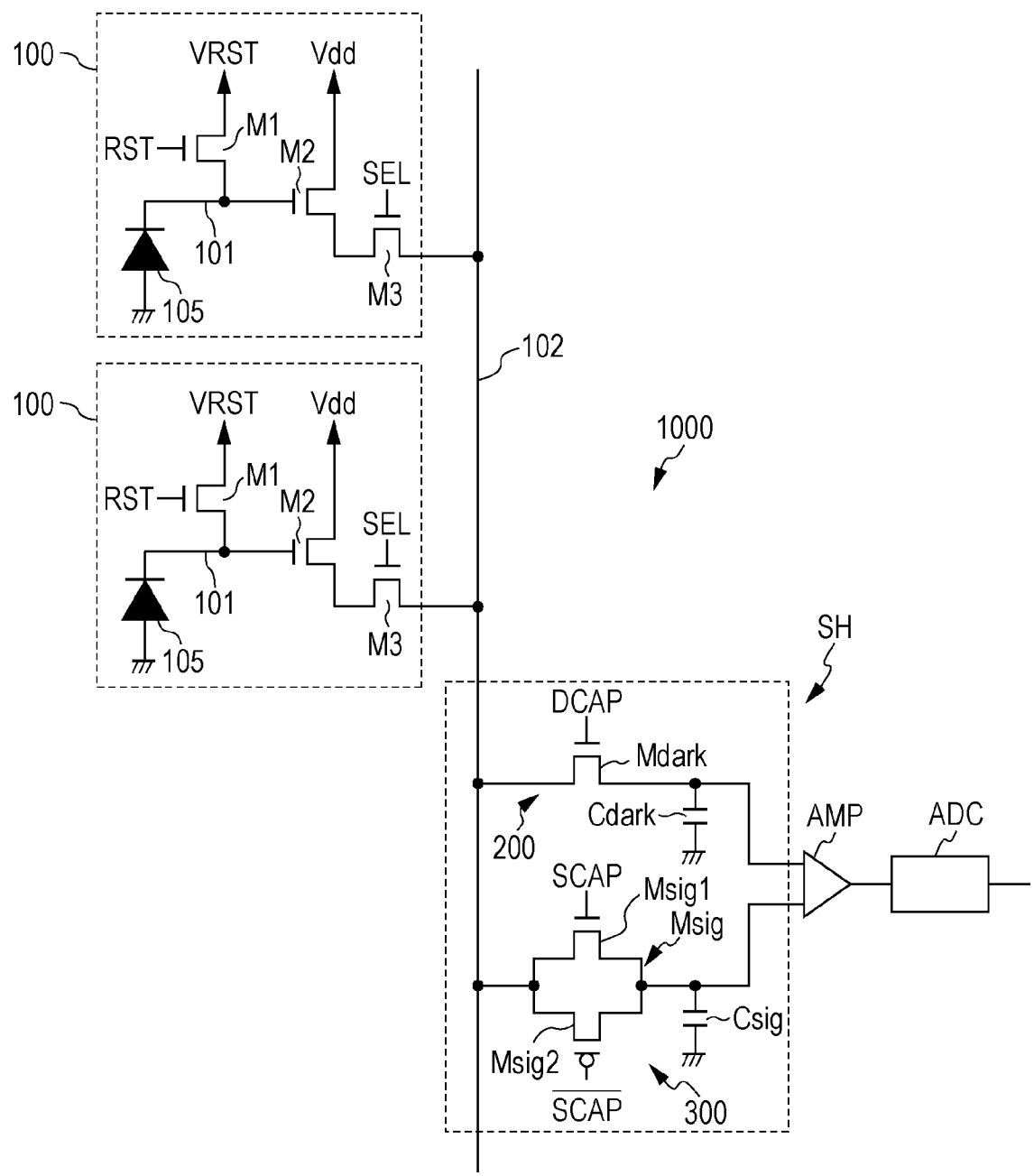
FIG. 1 is a circuit diagram schematically illustrating an exemplary circuit configuration of an imaging device according to an exemplary Embodiment 1.

An overview of an aspect of the present disclosure is as described in the following items.

[Item 1]
An imaging device including:
a pixel;
a signal line electrically connected to the pixel;

a first sample-and-hold circuit electrically connected to the signal line; and a second sample-and-hold circuit electrically connected to the signal line, in which the pixel includes a photoelectric converter that generates signal charge by photoelectric conversion, a charge accumulation region that accumulates the signal charge, a reset transistor that resets a voltage of the charge accumulation region to a reference voltage, and an amplifier transistor that amplifies a signal voltage corresponding to an amount of the signal charge accumulated in the charge accumulation region to output, the first sample-and-hold circuit includes a first switch that is electrically connected to the signal line and has input-output characteristics in which an output is linear with respect to an input up to a clipping voltage and the output is clipped at the clipping voltage with respect to the input exceeding the clipping voltage, and a first capacitor electrically connected to the signal line through the first switch, and the second sample-and-hold circuit includes a second switch that is electrically connected to the signal line and has input-output characteristics in which an output is linear with respect to an input, and a second capacitor electrically connected to the signal line through the second switch.

[Item 2]

The imaging device according to Item 1, further including:

a control circuit, in which the pixel outputs a reference signal corresponding to the reference voltage and a pixel signal corresponding to the signal voltage, to the signal line, and the control circuit switches the first switch on when the pixel outputs the reference signal, and switches the second switch on when the pixel outputs the pixel signal.

With the imaging device according to Item 1 or 2, a simple circuit configuration can suppress a blackening.

[Item 3]

The imaging device according to Item 1, in which the first switch includes a first transistor having a first conductive type, and the second switch includes a second transistor having the first conductive type, and a third transistor electrically connected with the second transistor in parallel and having a second conductive type different from the first conductive type.

With the imaging device according to Item 3, a phenomenon of a blackening occurring on an object with high luminance can be suppressed without adding a special circuit. Further, a peripheral circuit can be reduced in scale.

[Item 4]

The imaging device according to Item 1, in which the first switch includes an enhancement-type first transistor, and the second switch includes a depletion-type second transistor.

[Item 5]

The imaging device according to Item 4, in which a conductive type of the first transistor is the same as a conductive type of the second transistor.

With the imaging device according to Item 4 or 5, a variation of the circuit configuration is provided, and similarly to Item 3, the phenomenon of the blackening occurring on the object with the high luminance can be suppressed.

[Item 6]

The imaging device according to any one of Items 1 to 5, further including:

a differential amplifier electrically connected with the first sample-and-hold circuit and the second sample-and-hold circuit, in which the differential amplifier outputs a difference between a voltage held in the first capacitor and a voltage held in the second capacitor.

With the imaging device according to Item 6, a true pixel signal can be obtained.

[Item 7]

The imaging device according to any one of Items 1 to 6, further including:

an AD converter circuit that converts an output of the differential amplifier from an analog signal into a digital signal.

[Item 8]

The imaging device according to Item 7, in which the pixel outputs a pixel signal corresponding to the signal voltage, to the signal line, and a value obtained by subtracting the clipping voltage from a maximum value of the pixel signal is larger than a maximum value of an input voltage range of the AD converter circuit.

With the imaging device according to Item 7 or 8, the phenomenon of the blackening occurring on the object with the high luminance can be suppressed more effectively.

[Item 9]

The imaging device according to any one of Items 1 to 8, in which the first transistor is a MOS transistor, and when a power supply voltage is applied to a gate of the first transistor, the clipping voltage has a value obtained by subtracting a threshold voltage of the first transistor from the power supply voltage.

With the imaging device according to Item 9, the power supply voltage can be applied directly to a gate terminal of the first transistor, and an additional circuit that generates a control signal controlling the gate terminal need not be provided.

[Item 10]

The imaging device according to any one of Items 1 to 8, further including:

a step-down circuit that steps down a power supply voltage to generate a stepped-down voltage, in which the step-down circuit applies the stepped-down voltage to a gate of the first transistor, and the first transistor is a MOS transistor.

With the imaging device according to Item 10, a level of a voltage applied to a gate terminal of the first transistor can be adjusted.

[Item 11]

The imaging device according to Item 10, in which when the stepped-down voltage is applied to the gate of the first transistor, the clipping voltage has a value obtained by subtracting a threshold voltage of the first transistor from the stepped-down voltage.

With the imaging device according to Item 11, the clipping voltage at the output of the first sample-and-hold circuit can freely be changed.

[Item 12]

The imaging device according to any one of Items 3 to 7, in which the signal charge is a hole, and the first transistor having the first conductive type is an n-type MOS transistor.

With the imaging device according to Item 12, the imaging device that treats a hole as the signal charge and that can suppress the phenomenon of the blackening occurring on the object with the high luminance, is provided.

[Item 13]

The imaging device according to any one of Items 1 to 12, in which
the photoelectric converter includes
a first electrode,
a second electrode facing the first electrode, and
a photoelectric conversion film that is located between the first electrode and the second electrode and generates the signal charge by the photoelectric conversion.

With the imaging device according to Item 13, the imaging device including the photoelectric converter having the photoelectric conversion film and that can suppress the phenomenon of the blackening occurring on the object with the high luminance, is provided.

[Item 14]

The imaging device according to any one of Items 1 to 12, in which the photoelectric converter is a photodiode.

[Item 15]

The imaging device according to Item 14, in which the pixel includes a transfer transistor between the photoelectric converter and the charge accumulation region.

Embodiments of the present disclosure will be described below with reference to the drawings. The embodiments described below provide general or specific examples. Numerical values, shapes, materials, constituent elements, arrangement and connection modes of the constituent elements, steps, order of the steps, and the like in the below-described embodiments are mere examples, and not intended to limit the present disclosure. Various aspects described in the present specification may be combined with one another insofar as they do not cause a contradiction. Of the constituent elements in the following embodiments, constituent elements that are not stated in the independent claim representing the highest concept are described as any constituent element. In the following description, constituent elements having substantially the same functions are assigned the same reference characters and description thereof is omitted in some cases.

Embodiment 1

The structure and operation of an imaging device 1000 according to the present embodiment will be described with reference to FIGS. 1 to 9.

[Structure of Imaging Device 1000]

FIG. 1 schematically illustrates an exemplary circuit configuration of the imaging device 1000 according to the present embodiment.

The imaging device 1000 includes a plurality of pixels 100 and peripheral circuits. The pixels and the peripheral circuits are arrayed two-dimensionally. In an actual configuration, millions of pixels 100 may be arrayed two-dimensionally. For simplification of the drawings, only two pixels that are arranged in a line are depicted in FIG. 1. The imaging device 1000 may be a line sensor. In this case, the plurality of pixels 100 are arrayed one-dimensionally (in a row or column direction, for example).

The peripheral circuit includes a sample-and-hold circuit SH, a differential amplifier AMP, an analog-to-digital converter circuit ADC, a row scanning circuit (not illustrated), and a column scanning circuit (not illustrated), for example. The peripheral circuit mainly reads out a pixel signal from the pixel 100, processes the signal, and outputs the processed signal outside the imaging device. The analog-to-digital converter circuit will be denoted as an AD converter circuit hereunder.

The pixel 100 and the sample-and-hold circuit SH are electrically connected with each other through an output signal line 102 provided for each column. A reference signal and the pixel signal that are read out from the pixel 100 are sampled by the sample-and-hold circuit SH. The differential amplifier AMP obtains a difference between the sampled reference signal and pixel signal, whereby a true pixel signal is obtained.

The AD converter circuit ADC converts analog-to-digital the true pixel signal output from the differential amplifier AMP and outputs the digital signal. The imaging device 1000 can output RAW data as the pixel signal, for example.

The pixel 100 typically has a photoelectric converter 105, a reset transistor M1, an amplifier transistor M2, and a selection transistor M3.

The photoelectric converter 105 is, for example, a photodiode. The photoelectric converter 105 generates signal charge by photoelectric conversion. The photoelectric converter 105 is electrically connected with the reset transistor M1 and the amplifier transistor M2. A node electrically connecting the photoelectric converter 105 with the reset transistor M1 and the amplifier transistor M2 is generally referred to as a floating diffusion node. The floating diffusion node is called an FD node or a charge accumulation node in the present specification in some cases. The signal charge that is photoelectrically converted by the photoelectric converter 105 is accumulated in an FD node 101.

The reset transistor M1 is electrically connected with the FD node 101. In FIG. 1, one of a source and a drain of the reset transistor M1 is electrically connected with the FD node 101. The reset transistor M1 resets potential of the FD node 101 to reference potential VRST. The reset transistor M1 is controlled by a control signal RST input to a gate.

The amplifier transistor M2 is electrically connected with the FD node 101. In FIG. 1, a gate of the amplifier transistor M2 is electrically connected with the FD node 101. The amplifier transistor M2 amplifies a signal voltage corresponding to an amount of the signal charge accumulated in the FD node 101 to output.

The selection transistor M3 is electrically connected with the amplifier transistor M2 and the output signal line 102. The amplifier transistor M2 and the selection transistor M3 form a source follower circuit. The selection transistor M3 is controlled by a control signal SEL input to a gate. The selection transistor M3 selectively outputs a signal output from the amplifier transistor M2 to the output signal line 102.

The sample-and-hold circuit SH has a first sample-and-hold circuit 200 and a second sample-and-hold circuit 300.

The first sample-and-hold circuit 200 samples and holds the reference signal corresponding to the reference potential. The first sample-and-hold circuit 200 is electrically connected with the output signal line 102. The first sample-and-hold circuit 200 samples and holds the reference signal read out from the pixel 100.

The first sample-and-hold circuit 200 has a switch Mdark and a capacitor Cdark. The switch Mdark is an NMOS transistor and has a threshold voltage Vth1. The switch Mdark is controlled by a control signal DCAP input to a gate. The switch Mdark has input-output characteristics in which when a voltage input to one of a source and a drain exceeds a clipping voltage Vclip, a voltage to be output from the other one of the source and the drain is clipped at a predetermined value. The predetermined value discussed herein is typically a value equal to or more than 0 V and equal to or less than a power supply voltage Vdd. The input-output characteristics of the switch Mdark will be described later. The power supply voltage Vdd discussed herein represents a voltage supplied to a drain of the amplifier transistor M2. That is, the power supply voltage Vdd represents a voltage supplied to a terminal opposite to the output signal line 102 for the amplifier transistor M2.

The second sample-and-hold circuit 300 samples and holds the pixel signal corresponding to the amount of the signal charge accumulated in the FD node 101. The second sample-and-hold circuit 300 is electrically connected with the output signal line 102. The second sample-and-hold circuit 300 samples and holds the pixel signal read out from the pixel 100.

The second sample-and-hold circuit 300 has a switch Msig and a capacitor Csig. The switch Msig is a complementary metal oxide semiconductor (CMOS) transistor and has two switches of a switch Msig1 and a switch Msig2 that are electrically connected with each other in parallel. Use of the CMOS transistor for the switch Msig allows to secure an output range of the switch, which will be described later.

The switch Msig1 is an NMOS transistor. The switch Msig2 is a PMOS transistor. The switch Msig is controlled by a control signal SCAP input to gates of the switch Msig1 and the switch Msig2. To be specific, the switch Msig1 is controlled by the gate control signal SCAP with positive logic, while the switch Msig2 is controlled by the gate control signal SCAP with negative logic.

In the present specification, an example of the signal charge being a hole will be described. However, the present disclosure also encompasses an imaging device with signal charge being an electron. Conductive types of the transistors in the first sample-and-hold circuit 200 and the second sample-and-hold circuit 300 depend on the type of the signal charge. Desirably, when the signal charge is a hole, the n-type transistor is used for the switch Mdark, while when the signal charge is an electron, the p-type transistor is used for the switch Mdark, for example. The switch Mdark and the switch Msig in the present embodiment are enhancement-type transistors.

When the reference signal is read out from the pixel 100, the first sample-and-hold circuit 200 is switched on and the second sample-and-hold circuit 300 is switched off. Specifically, the switch Mdark is switched on and the switch Msig is switched off. This switching operation enables the first sample-and-hold circuit 200 to sample the reference signal. The sampled reference signal is held in the capacitor Cdark.

When the pixel signal is read out from the pixel 100, the first sample-and-hold circuit 200 is switched off and the second sample-and-hold circuit 300 is switched on. Specifically, the switch Mdark is switched off and the switch Msig is switched on. This switching operation enables the second sample-and-hold circuit 300 to sample the pixel signal. The sampled pixel signal is held in the capacitor Csig.

Respective output values of the first sample-and-hold circuit 200 and the second sample-and-hold circuit 300 are input to the differential amplifier AMP. The differential amplifier AMP obtains a difference between the reference signal held in the capacitor Cdark and the pixel signal held in the capacitor Csig and outputs the true pixel signal.

Figure 2:
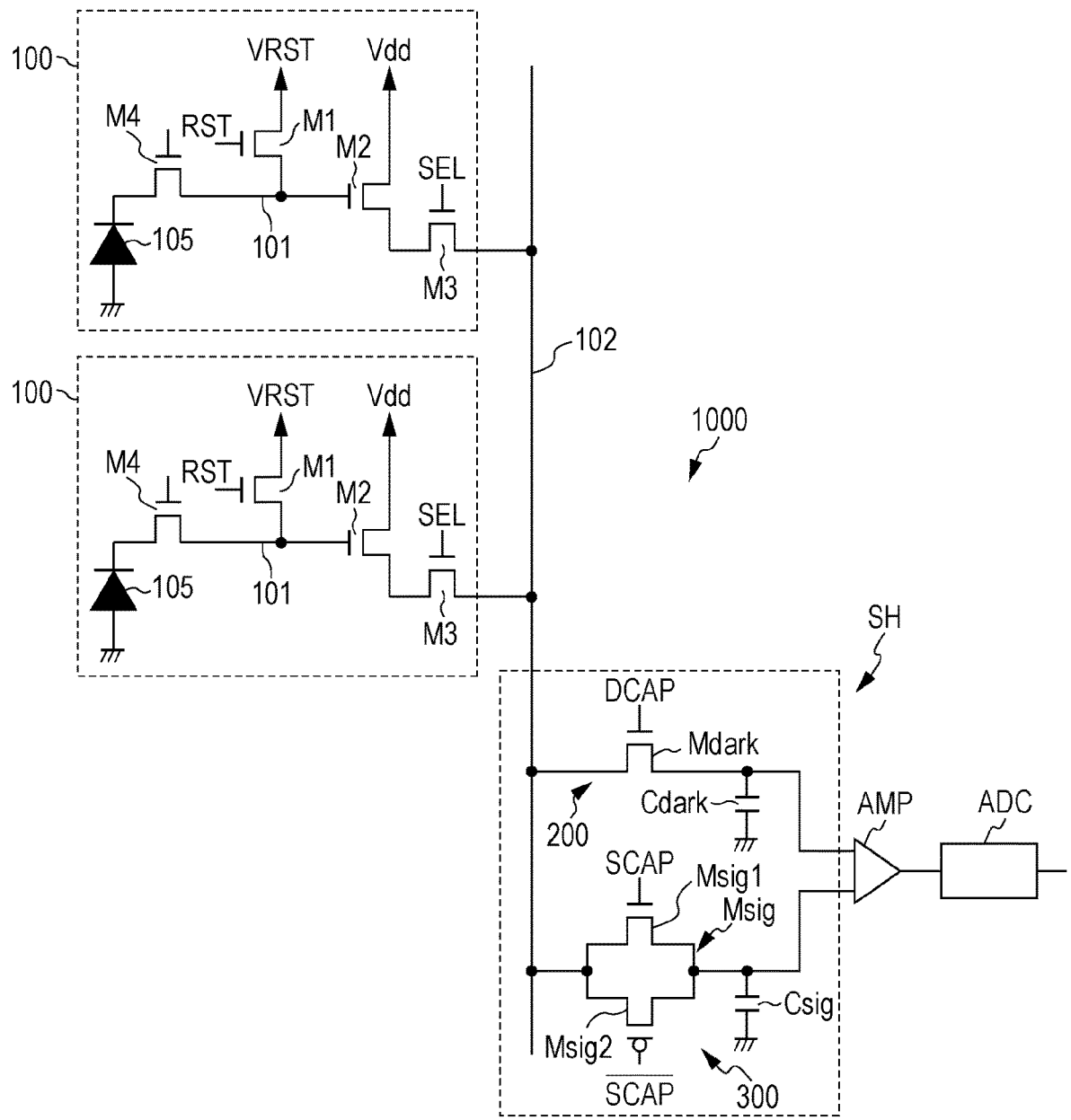
FIG. 2 is a circuit diagram schematically illustrating another exemplary circuit configuration of the imaging device according to the exemplary Embodiment 1.

FIG. 2 schematically illustrates another exemplary circuit configuration of the imaging device 1000 according to the present embodiment.

As illustrated in FIG. 2, the pixel 100 may include a transfer transistor M4. Use of the transfer transistor M4 allows the signal charge from the photoelectric converter 105 to completely be transferred to the FD node 101. The transfer transistor M4 is used in a commonly used CMOS imaging sensor.

(Modification of Pixel 100)

Figure 3:
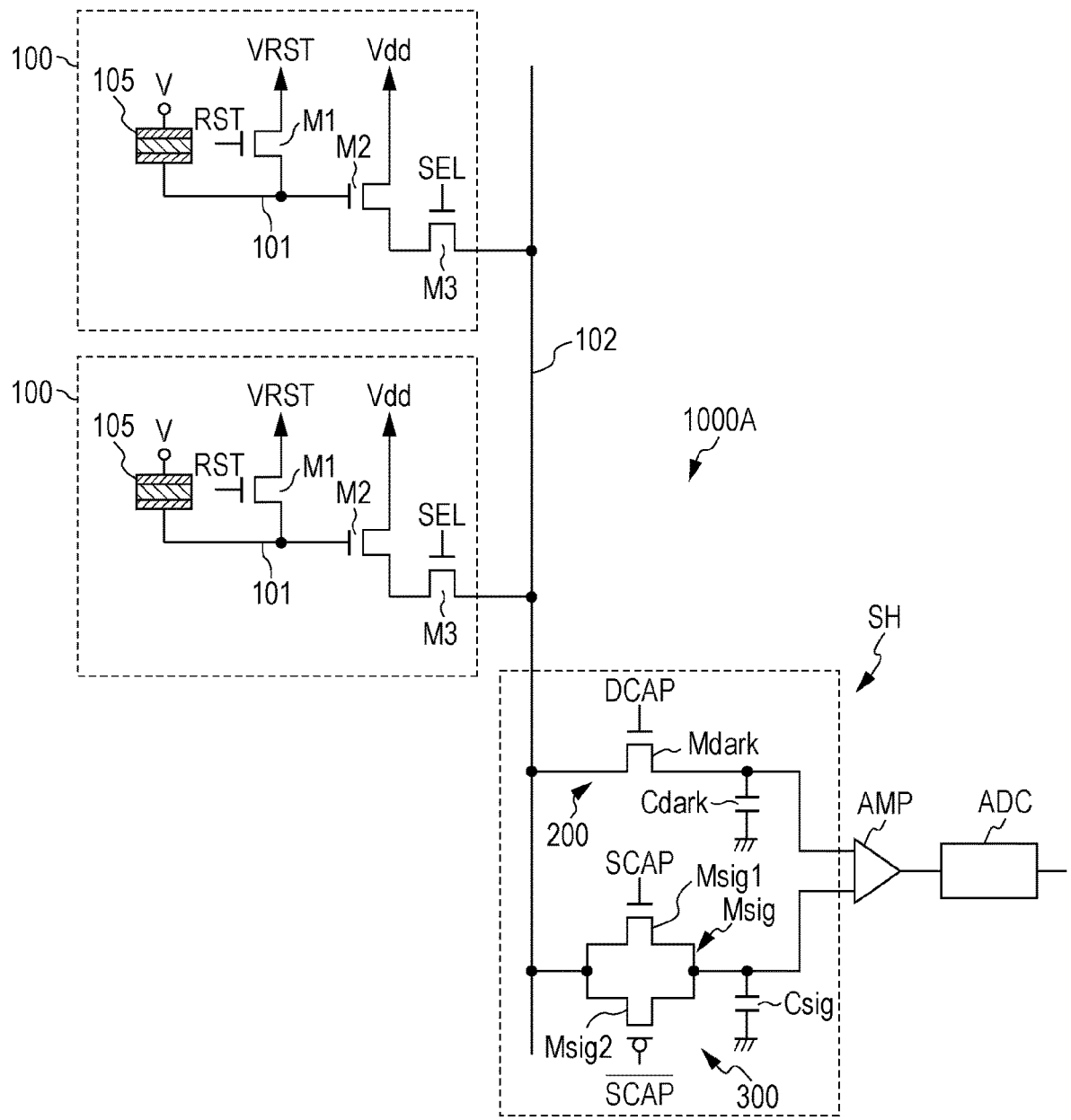
FIG. 3 is a circuit diagram schematically illustrating an exemplary circuit configuration of an imaging device according to a variation of the exemplary Embodiment 1.
Figure 4:
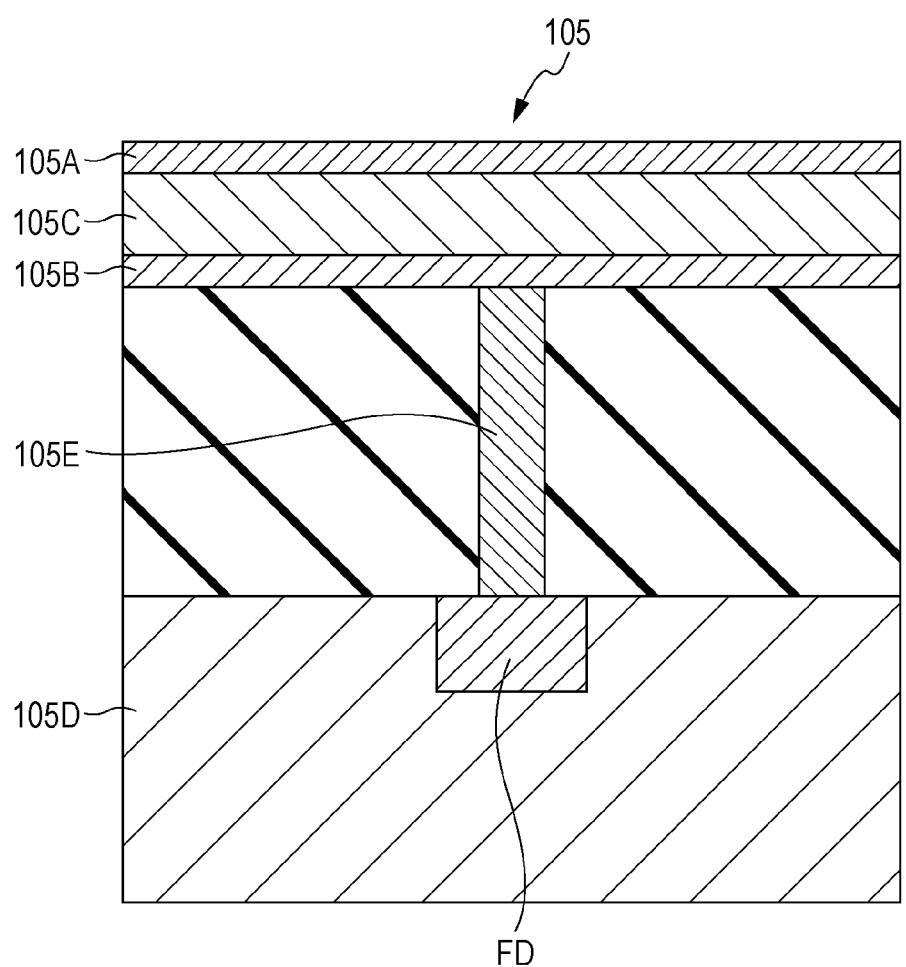
FIG. 4 is a sectional view schematically illustrating a cross section of a photoelectric converter of a pixel, along a normal direction of a semiconductor substrate.

FIG. 3 schematically illustrates an exemplary circuit configuration of an imaging device 1000A according to a variation of the present embodiment. FIG. 3 is different from FIG. 1 in the configuration of the photoelectric converter 105. FIG. 4 schematically illustrates a cross section of the photoelectric converter 105, along a normal direction of a semiconductor substrate 105D.

As illustrated in FIG. 4, the photoelectric converter 105 in the pixel 100 depicted in FIG. 3 has a transparent electrode 105A, a pixel electrode 105B, and a photoelectric conversion film 105C that is disposed between the transparent electrode 105A and the pixel electrode 105B. The pixel electrode 105B is electrically connected with a control circuit (not illustrated) that controls potential of the electrode. The FD node 101 is included in the semiconductor substrate 105D and electrically connected with the pixel electrode 105B through a contact plug 105E. In the present disclosure, the photoelectric converter 105 may be a photodiode or may include the photoelectric conversion film 105C as illustrated in FIG. 4.

In the imaging device 1000A depicted in FIG. 3, the electric charge is collected as follows. Light from the transparent electrode 105A side enters the photoelectric conversion film 105C to generate positive and negative charges by photoelectric conversion. When a voltage is applied between the transparent electrode 105A and the pixel electrode 105B at this time, an electric field is generated. As a result, one of the positive and negative charges is collected by the pixel electrode 105B. For example, voltages of 10 V and 0 V are applied respectively to the transparent electrode 105A and the pixel electrode 105B, and the positive charge is collected by the pixel electrode 105B. This charge moves from the pixel electrode 105B to the FD node 101 and is accumulated in the FD node 101.

[Operation of Imaging Device 1000]

The operation of imaging an object with normal luminance will be described first.

Figure 5:
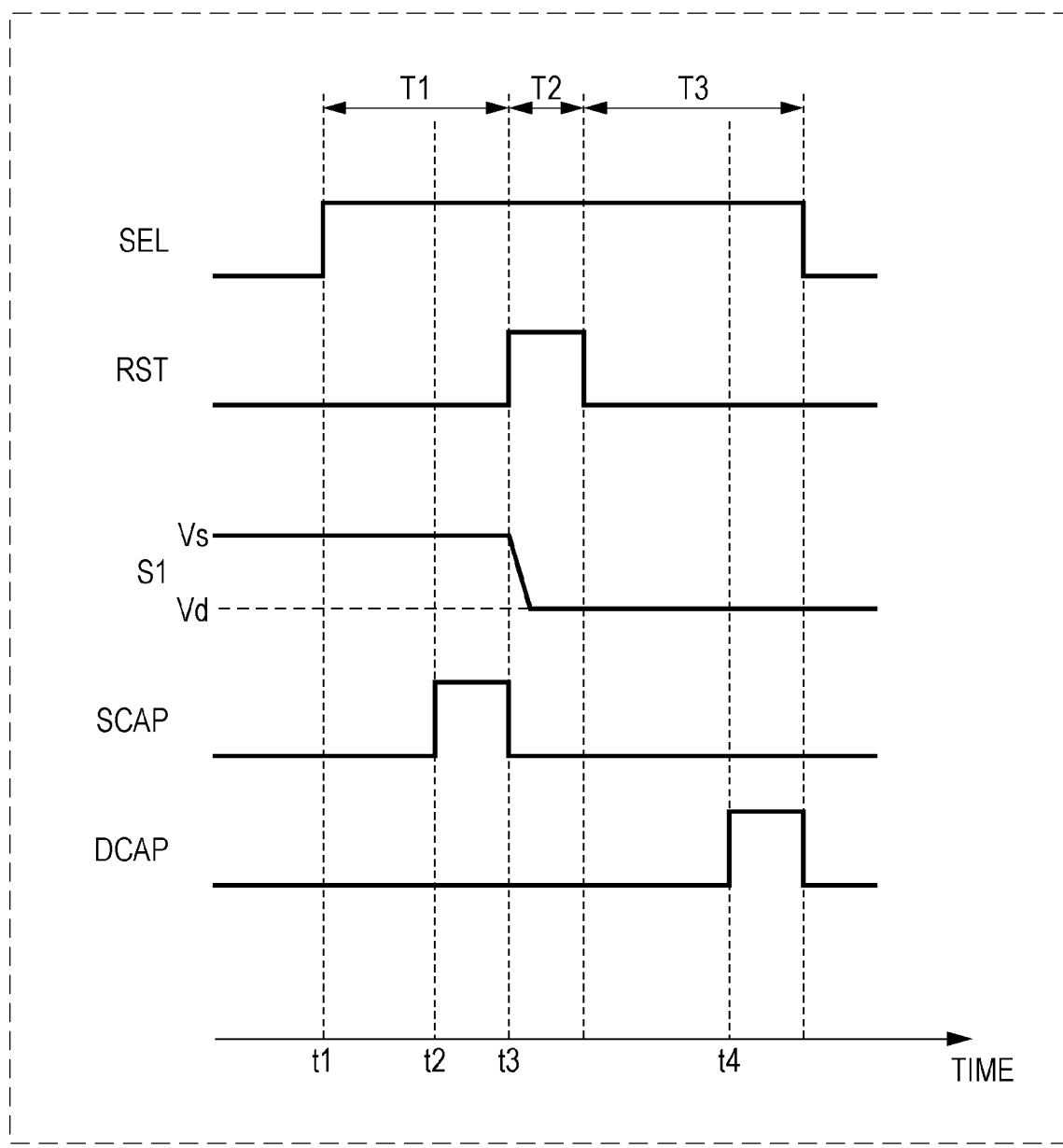
FIG. 5 is a timing diagram illustrating an exemplary operation timing when an object with normal luminance is imaged.

FIG. 5 illustrates an exemplary operation timing when the object with the normal luminance is imaged. In FIG. 5, waveforms of the control signal SEL, the control signal RST, a signal S1 output to the output signal line 102, the control signal SCAP, and the control signal DCAP are provided.

(1-1. Pixel Signal Read-Out Period T1)

At time t1, the control signal SEL is switched to a high level to turn on the selection transistor M3. Consequently, any of the pixels 100 to be read out is selected for each column to start reading out the pixel signal from the selected pixel 100. Specifically, the above-described source follower circuit outputs to the output signal line 102, a pixel signal corresponding to the amount of the signal charge accumulated in the FD node 101.

Assume that a gain of the source follower circuit is Gsf. The voltage of the output signal line 102 is a signal voltage Vs expressed by Formula (1), where $\Delta VPC$ is the pixel signal voltage corresponding to the amount of the charge generated by photoelectric conversion, and Vt0 is a threshold voltage of the amplifier transistor M2.

$$Vs = Gsf \times (VRST + \Delta VPC - Vt0) \tag{1}$$

At time t2, the control signal SCAP is switched to a high level to turn on the switch Msig. Consequently, the capacitor Csig and the output signal line 102 are electrically connected through the switch Msig to hold the signal voltage Vs in the capacitor Csig.

(1-2. Reset Period T2)

At time t3, the control signal RST is switched to a high level to turn on the reset transistor M1. Consequently, the potential of the FD node 101 is reset to the reference potential VRST. The voltage of the output signal line 102 is a signal voltage Vd expressed by Formula (2).

$$Vd = Gsf \times (VRST - Vt0) \quad (2)$$

(1-3 Reference Signal Read-Out Period T3)

At time t4, the control signal DCAP is switched to a high level to turn on the switch Mdark. Consequently, the capacitor Cdark and the output signal line 102 are electrically connected. The high level of the control signal DCAP corresponds to the power supply voltage Vdd, for example.

Figure 6:
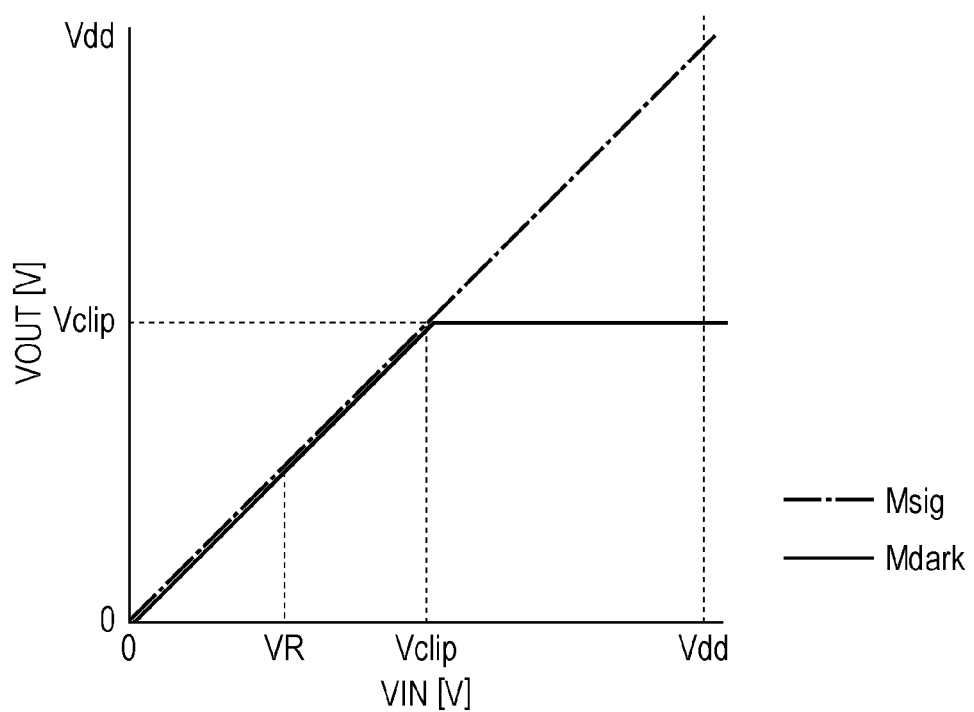
FIG. 6 is a graph illustrating input-output characteristics of a switch Msig and a switch Mdark.

FIG. 6 illustrates input-output characteristics of the switch Msig and the switch Mdark. The abscissa indicates an input voltage VIN (V) for both transistors, and the ordinate indicates an output voltage VOUT (V) therefor. The solid line indicates the input-output characteristics of the switch Mdark, while the dashed-dotted line indicates the input-output characteristics of the switch Msig.

The switch Msig is the CMOS transistor, as described above. The switch Msig has linear input-output characteristics, as illustrated in FIG. 6. The signal voltage Vs input to the switch Msig is therefore output without any change. The output signal voltage Vs is held in the capacitor Csig.

The switch Mdark is the NMOS transistor. The input-output characteristics of the switch Mdark indicated in FIG. 6 are expressed by Formulas (3) and (4) below.

When $VIN \leq Vclip = Vdd - Vth1$ $$VOUT = VIN \quad (3)$$

When $VIN > Vclip = Vdd - Vth1$ $$VOUT = Vclip = Vdd - Vth1 \quad (4)$$

When an object with the normal luminance is imaged, the voltage of the output signal line 102 at the time of reset is set so as to fall within a range of VIN where Formula (3) holds. That is, the value of the reference potential VRST is selected so that $Gsf \times (VRST - Vt0) \leq Vdd - Vth1$ is satisfied. Here, $Gsf \times (VRST - Vt0)$ is equal to the signal voltage Vd after the reset. In addition, the control signal DCAP at the high level is applied to the switch Mdark. Consequently, the signal voltage Vd is held in the capacitor Cdark. The signal voltage Vd when the object with the normal luminance is imaged does not depend on the amount of incident light, and thus is VR in FIG. 6, for example.

The differential amplifier AMP obtains a difference between the signal voltage Vs output during the pixel signal read-out period and the signal voltage Vd output during the reference signal read-out period, whereby a difference voltage Vpix representing the true pixel signal is obtained. The difference voltage Vpix is expressed by Formula (5).

$$\begin{aligned} Vpix &= Vs - Vd \\ &= Gsf \times (VRST + \Delta VPC - Vt0) - Gsf \times (VRST - Vt0) \\ &= Gsf \times \Delta VPC \end{aligned} \quad (5)$$

Next, the operation of imaging an object with high luminance which may generate a blackening will be described.

Figure 7:
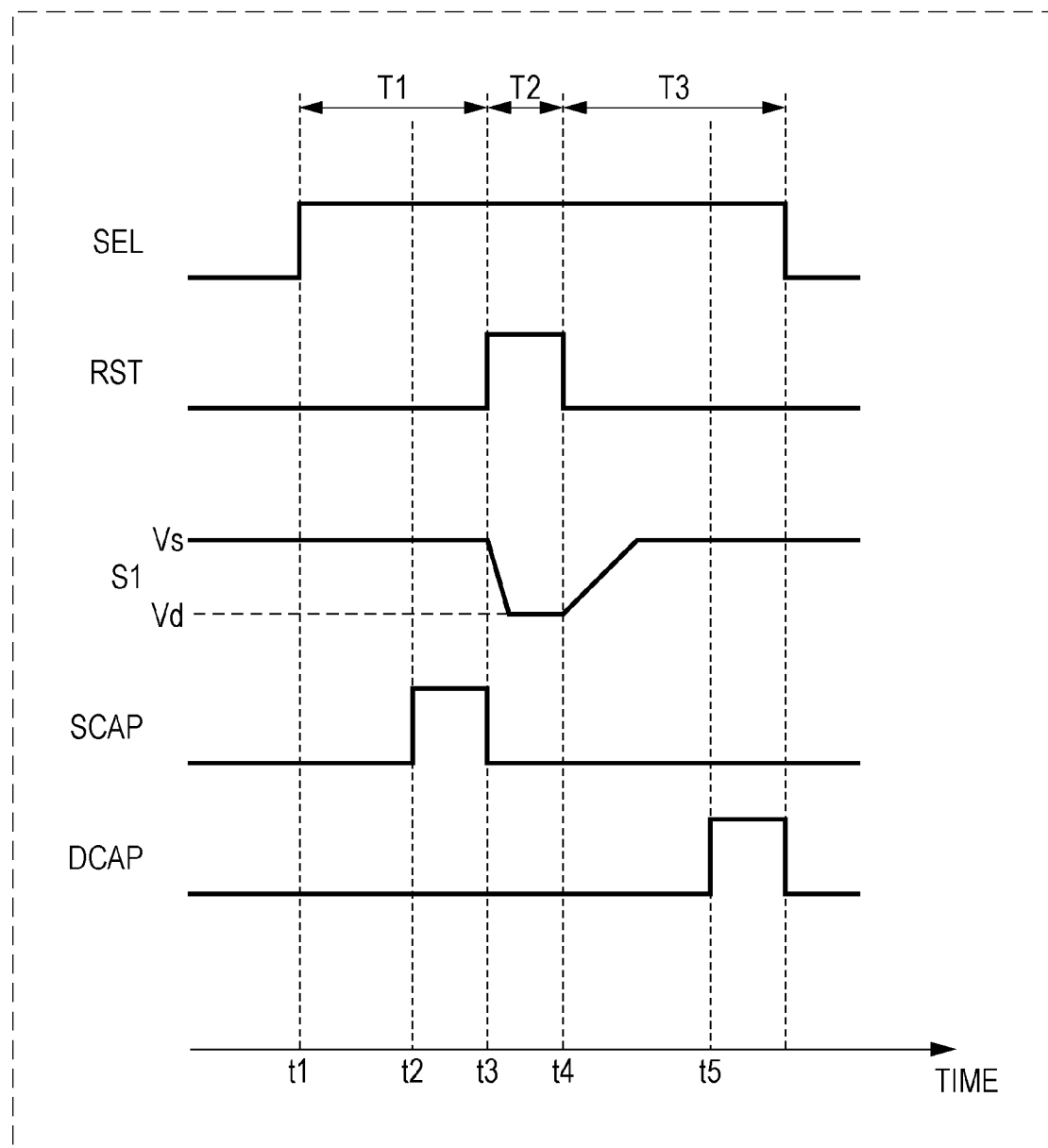
FIG. 7 is a timing diagram illustrating an exemplary operation timing when an object with high luminance is imaged.

FIG. 7 illustrates an exemplary operation timing when the object with the high luminance is imaged. In FIG. 7, waveforms of the control signal SEL, the control signal RST, the signal S1 output to the output signal line 102, the control signal SCAP, and the control signal DCAP are provided.

(2-1. Pixel Signal Read-Out Period T1)

The operation of the period T1 is the same as the operation of imaging the object with the normal luminance. This operation in the period T1 results in the signal voltage Vs being held in the capacitor Csig. However, when the object with the high luminance is imaged, the charge generated by photoelectric conversion is saturated. Thus, the pixel signal voltage corresponding to the amount of the charge accumulated in the FD node 101 is also saturated. The saturated pixel signal voltage is expressed by ΔVPC_MAX. Substituting ΔVPC in Formula (1) with ΔVPC_MAX results in Formula (6).

$$Vs = Gsf \times (VRST + \Delta VPC\_MAX - Vt0) \quad (6)$$

(2-2. Reset Period T2)

At time t3, the control signal RST is switched to the high level to turn on the reset transistor M1. Consequently, the potential of the FD node 101 is reset to the reference potential VRST.

(2-3. Reference Signal Read-Out Period T3)

At time t4, the control signal RST is switched to a low level to turn off the reset transistor M1. When the object with the high luminance is imaged, a large amount of signal charge is also generated by photoelectric conversion during the period from time t4 to time t5. Thus, the potential of the FD node 101 abruptly rises. In the case of the electron signal charge, the potential of the FD node 101 abruptly drops. The maximum potential of the FD node 101 may reach the same level as that of the signal voltage Vs. When the control signal DCAP is switched to the high level at time t5 in this state, the maximum signal voltage Vd expressed by Formula (7) may be output to the output signal line 102.

$$Vd = Gsf \times (VRST + \Delta VPC\_MAX - Vt0) \quad (7)$$

If the signal voltage Vd expressed by Formula (7) is output, the difference between the signal voltage Vd and the signal voltage Vs is zero. For this reason, the blackening is generated when the object with the high luminance is imaged.

In the present embodiment, the switch Mdark exhibits the input-output characteristics illustrated in FIG. 6. As has been described, when the object with the high luminance is imaged, it is sufficiently likely that the signal voltage Vd rises and the input voltage VIN of the switch Mdark exceeds the clipping voltage Vclip. That is, the case of Vd>Vdd–Vth1 may occur. Even in this case, the output voltage VOUT of the switch Mdark is clipped at Vclip, namely, Vdd–Vth1, based on Formula (4). The signal voltage Vd=Vdd–Vth1 is therefore held in the capacitor Cdark.

The differential amplifier AMP obtains a difference between the signal voltage Vs and the signal voltage Vd, whereby the difference voltage Vpix is obtained. The difference voltage Vpix is expressed by Formula (8). This value may be a value other than zero.

$$\begin{aligned} Vpix &= Vs - Vd \\ &= Gsf \times (VRST + \Delta VPC\_MAX - Vt0) - (Vdd - Vth1) \end{aligned} \quad (8)$$

With the switch configuration of the sample-and-hold circuits SH according to the present embodiment, the phenomenon of the blackening occurring on the object with the high luminance can be suppressed without adding a special circuit. Further, the peripheral circuits can be reduced in scale.

(Modification of Imaging Device 1000)

Figure 8:
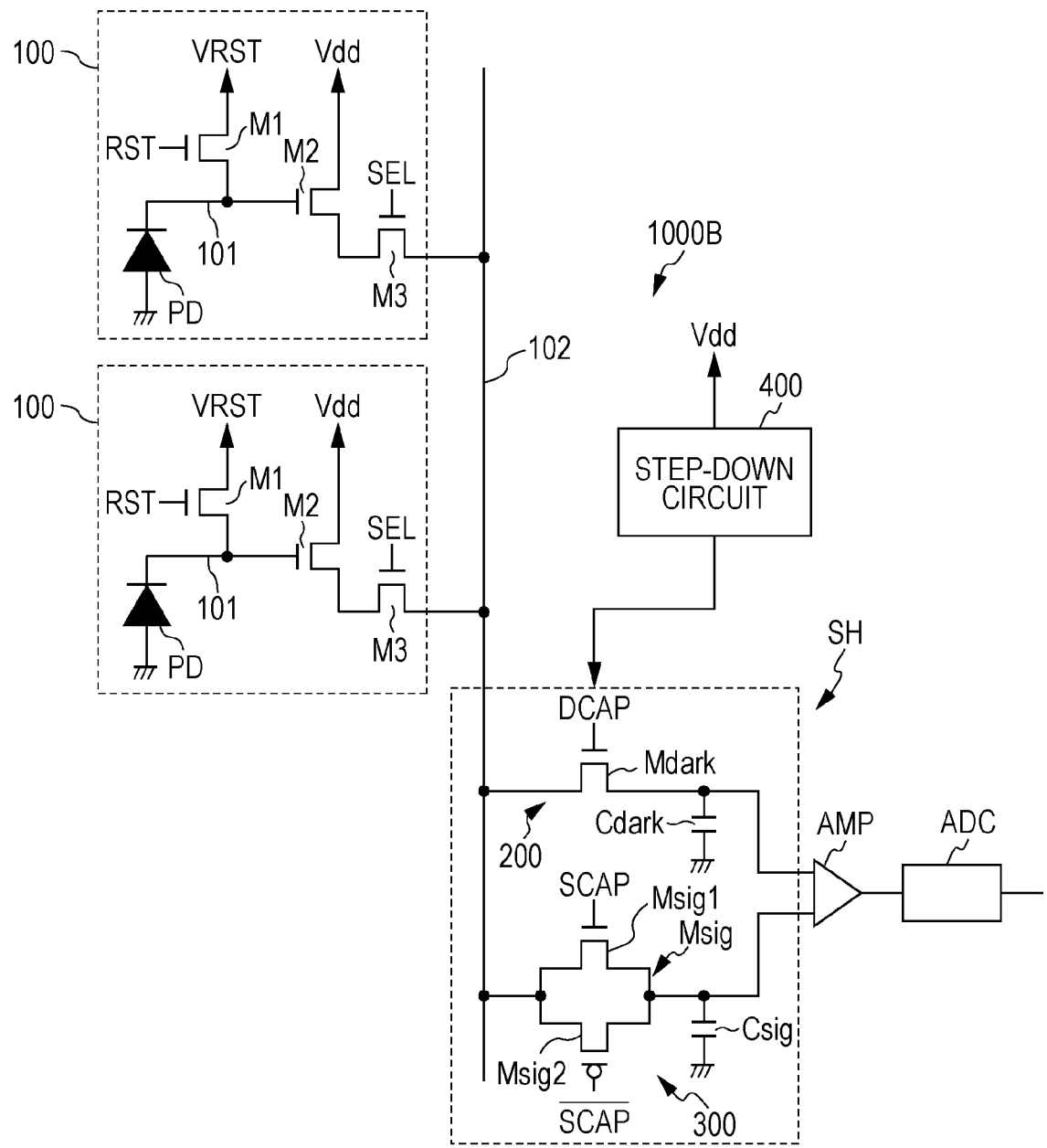
FIG. 8 is a circuit diagram schematically illustrating an exemplary circuit configuration of an imaging device according to another variation of the exemplary Embodiment 1.

FIG. 8 schematically illustrates an exemplary circuit configuration of an imaging device 1000B according to another variation of the present embodiment.

The imaging device 1000B further includes a step-down circuit 400 that generates the control signal DCAP.

The step-down circuit 400, for example, steps down the power supply voltage Vdd and generates a stepped-down voltage. For example, the stepped-down voltage is an intermediate voltage of the power supply voltage (e.g. Vdd/2). The stepped-down voltage is input to the gate of the switch Mdark.

Figure 9:
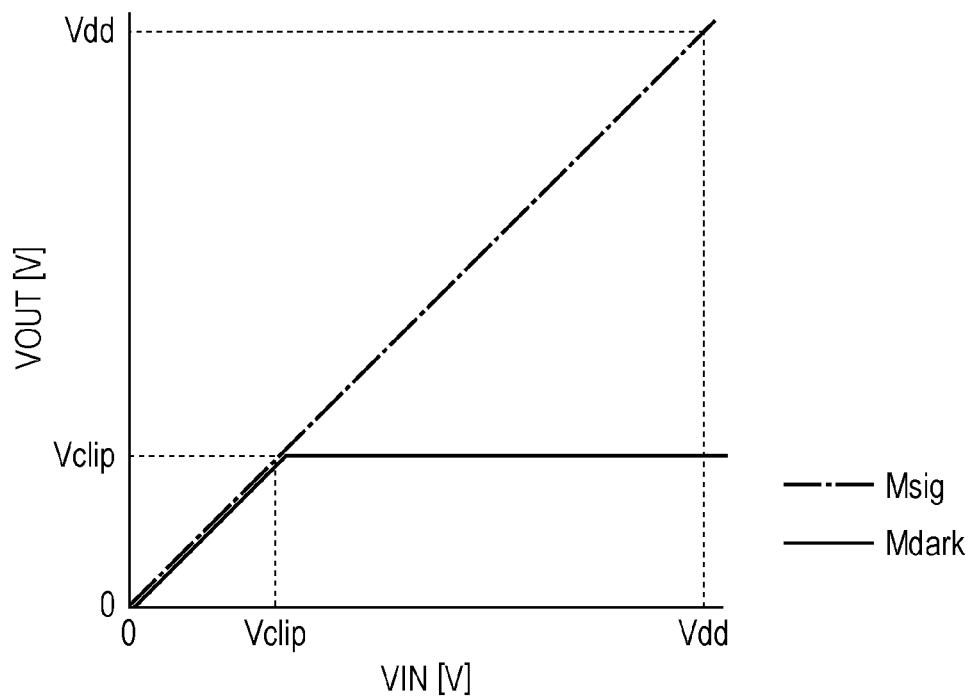
FIG. 9 is a graph illustrating input-output characteristics of the switch Msig and the switch Mdark.

FIG. 9 illustrates input-output characteristics of the switch Msig and the switch Mdark. The abscissa indicates the input voltage VIN (V) and the ordinate indicates the output voltage VOUT (V). The solid line indicates the input-output characteristics of the switch Mdark, while the dashed-dotted line indicates the input-output characteristics of the switch Msig.

FIG. 9 illustrates the input-output characteristics of the switch Mdark when the control signal DCAP corresponding to the intermediate voltage of the power supply voltage Vdd is applied to the switch Mdark. The clipping voltage Vclip at the output of the switch Mdark is thus (Vdd/2)−Vth1. The switch Msig has the linear input-output characteristics. The input-output characteristics of the switch Mdark are expressed by Formulas (9) and (10) below.

When $VIN \leq Vclip=(Vdd/2)-Vth1$ $$VOUT=VIN \quad (9)$$

When $VIN > Vclip=(Vdd/2)-Vth1$ $$VOUT=Vclip=(Vdd/2)-Vth1 \quad (10)$$

In this manner, the level of the control signal DCAP can be adjusted to change the input-output characteristics of the switch Mdark. Specifically, the clipping voltage at the output of the switch Mdark can be changed.

The case is discussed where Vpix_MAX, which is the maximum value of Vpix, exceeds an input range of the AD converter circuit ADC, that is, where Vpix_MAX is larger than a maximum value VAD at the input of the AD converter circuit ADC. In this case, Vpix_MAX is output from the AD converter circuit ADC as a saturated signal, and a corresponding pixel looks white. Conversely, in the case where the value of Vpix_MAX is smaller than VAD, Vpix_MAX is not a saturated signal. That is, the corresponding pixel looks gray, for example.

In this manner, Vpix_MAX may be smaller than VAD depending on settings of the input range of the AD converter circuit ADC and the clipping voltage Vclip. This may produce an unused range of the input range of the AD converter circuit ADC, which possibly narrows the color range of the image to be obtained.

However, use of the step-down circuit 400 as in the present embodiment allows the clipping voltage Vclip to be changed, and thus, the clipping voltage Vclip can be adjusted in accordance with the input range of the AD converter circuit ADC. Consequently, AD converter circuits with various input ranges can be used.

The following values can be used as an example: Vdd=3.0 V, Vth1=1.5 V, Gsf=0.9, VRST+ΔVPC_MAX=Vdd=3.0 V, Vt0=0.3 V, and VAD=0.6 V. In this case, Vpix_MAX=0.6 V holds and corresponds to VAD. The input range VAD of the AD converter circuit ADC when the power supply voltage is approximately 3.0 V, is 0.1 V or more or 2.0 V or less, for example.

Embodiment 2

Figure 10:
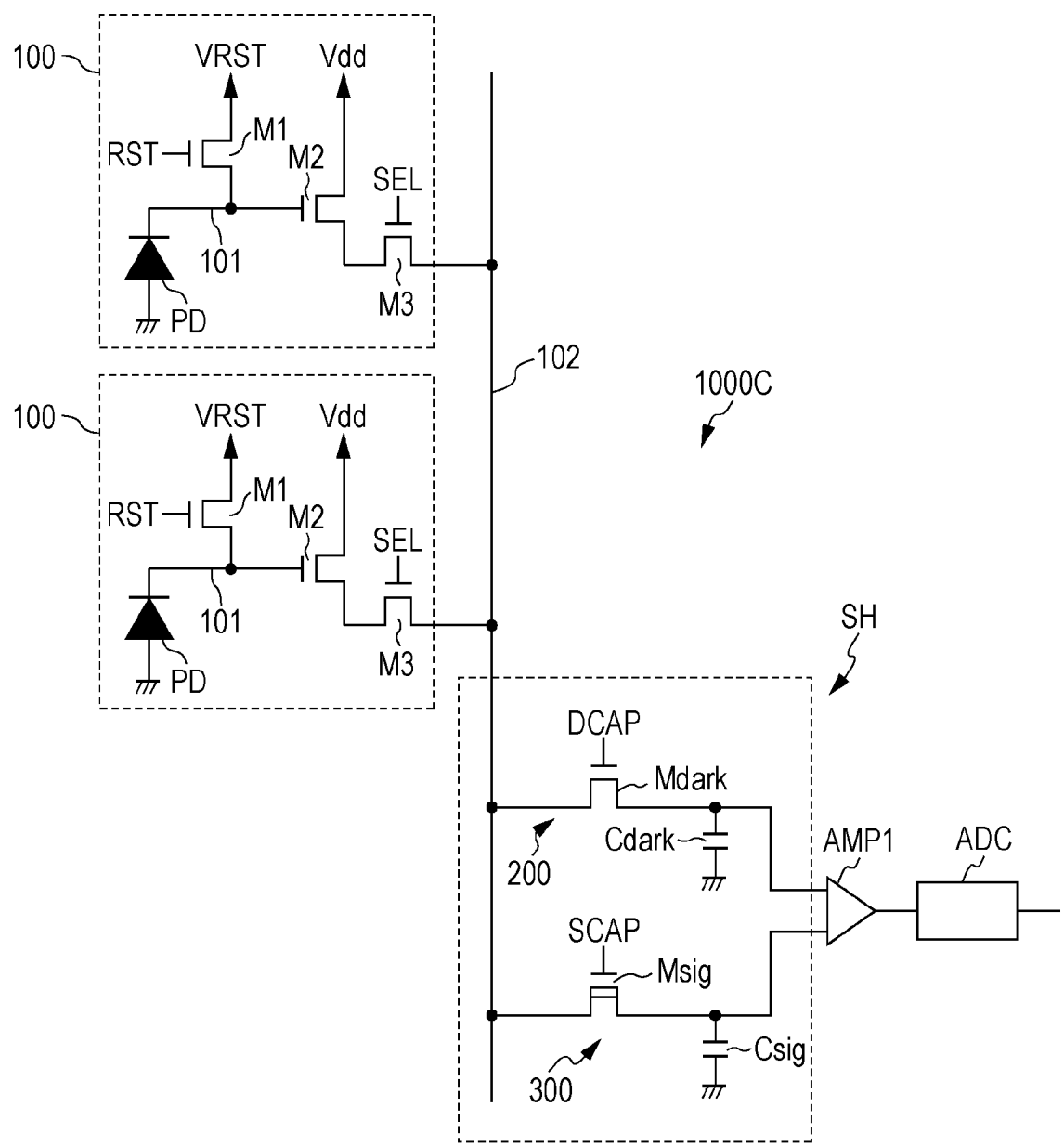
FIG. 10 is a circuit diagram schematically illustrating an exemplary circuit configuration of an imaging device according to an exemplary Embodiment 2.

FIG. 10 schematically illustrates an exemplary circuit configuration of an imaging device 1000C according to the present embodiment.

The imaging device 1000C according to the present embodiment is different from the imaging device 1000 according to Embodiment 1 in the configuration of the switch Msig. The difference thereof will mainly be described below.

The switch Msig in the present embodiment is a depletion-type NMOS transistor. The switch Msig is configured by one transistor in the present embodiment.

Figure 11:
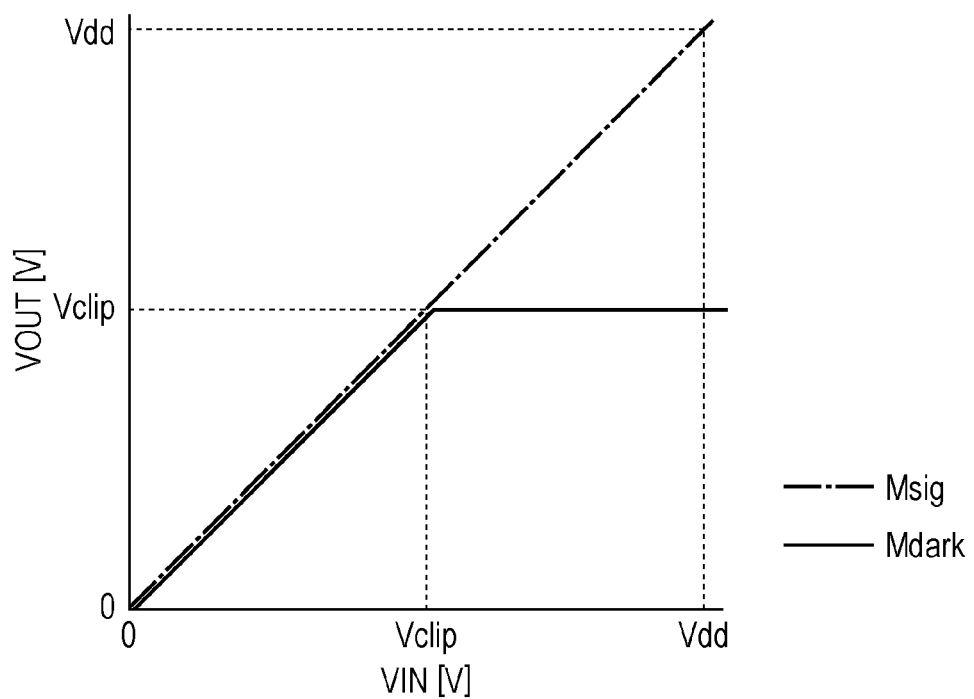
FIG. 11 is a graph illustrating input-output characteristics of the switch Msig and the switch Mdark.

FIG. 11 illustrates input-output characteristics of the switch Msig and the switch Mdark. The abscissa indicates the input voltages VIN (V) and the ordinate indicates the output voltages VOUT (V). The solid line indicates the input-output characteristics of the switch Mdark, while the dashed-dotted line indicates the input-output characteristics of the switch Msig.

The switch Msig of the depletion-type NMOS transistor has the input-output characteristics of VIN=VOUT. The switch Mdark, on the other hand, is the enhancement-type NMOS transistor. Assuming that the threshold voltage of the switch Mdark is Vth2, the input-output characteristics of the switch Mdark in FIG. 11 is expressed by Formulas (11) and (12) below. Characteristics that is the same as the input-output characteristics of the switches Mdark and Msig in Embodiment 1 are obtained.

When $VIN \leq Vclip=Vdd-Vth2$ $$VOUT=VIN \quad (11)$$

When $VIN > Vclip=Vdd-Vth2$ $$VOUT=Vclip=Vdd-Vth2 \quad (12)$$

When the object with the high luminance is imaged, it is sufficiently likely that the signal voltage Vd rises and the input voltage VIN of the switch Mdark exceeds the clipping voltage Vclip. That is, the case of Vd>Vdd−Vth2 may occur. Even in this case, the control signal DCAP at the high level is applied to the switch Mdark, thereby clipping the output voltage VOUT at Vclip, namely, Vdd−Vth2, based on Formula (12).

Clipping the signal voltage Vd having the reset voltage level at Vdd−Vth2 allows the occurrence of the blackening to be suppressed when imaging an object with the high luminance, similarly to Embodiment 1.

Embodiment 3

Figure 12:
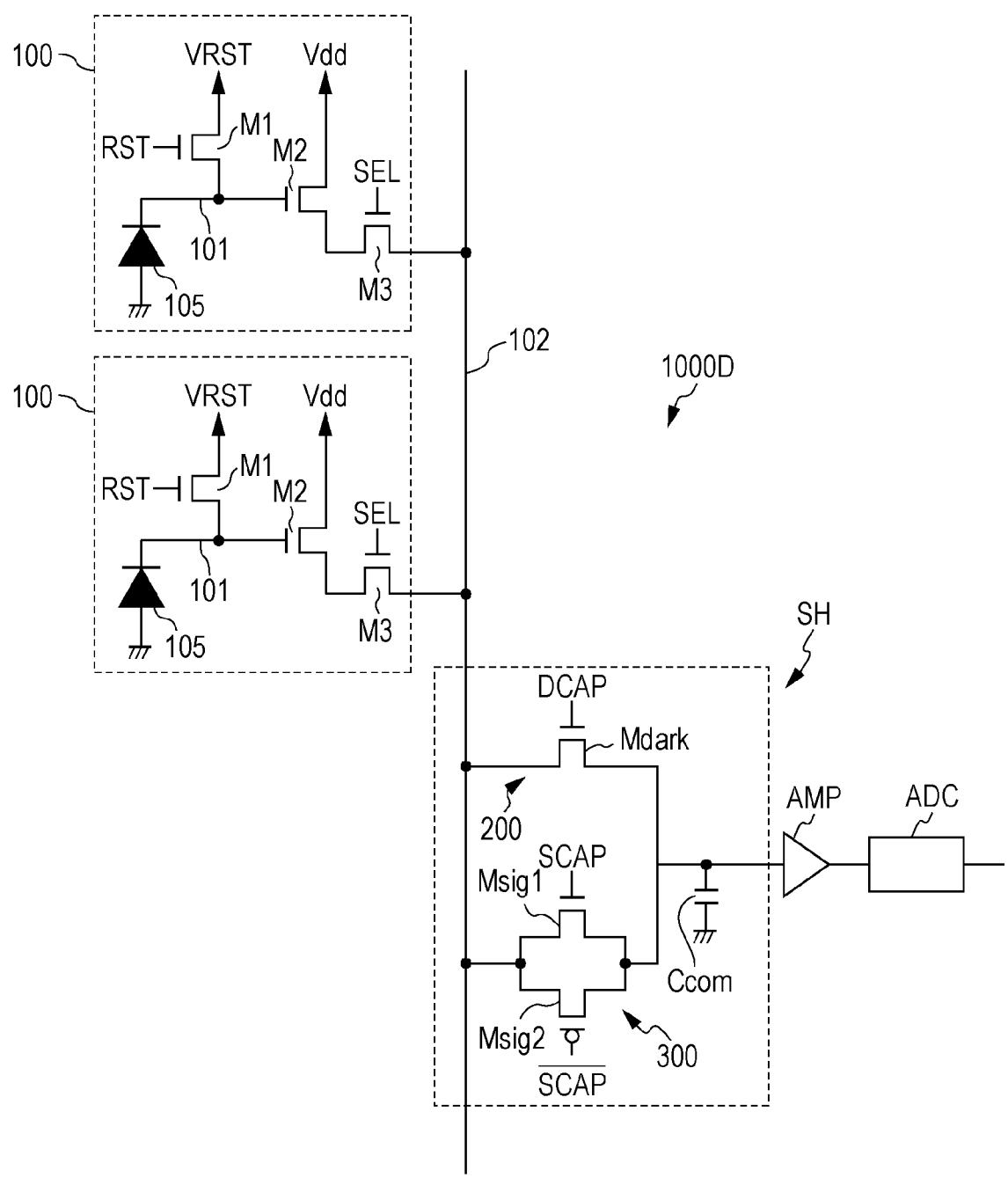
FIG. 12 is a circuit diagram schematically illustrating an exemplary circuit configuration of an imaging device according to an exemplary Embodiment 3.

FIG. 12 schematically illustrates an exemplary circuit configuration of an imaging device 1000D according to the present embodiment. The imaging device 1000D according to the present embodiment is different from the imaging device 1000 according to Embodiment 1 in that the pixel signal and the reference signal are held in the same capacitor. The difference thereof will mainly be described below.

When the pixel signal is read out from the pixel 100, the first sample-and-hold circuit 200 is switched off and the second sample-and-hold circuit 300 is switched on. Specifically, the switch Mdark is switched off and the switch Msig is switched on. Consequently, the second sample-and-hold circuit 300 samples the pixel signal. The pixel signal held in a capacitor Ccom is analog-to-digitally converted by the AD converter circuit ADC via the differential amplifier AMP.

Next, when the reference signal is read out from the pixel 100, the first sample-and-hold circuit 200 is switched on and the second sample-and-hold circuit 300 is switched off. Specifically, the switch Mdark is switched on and the switch Msig1 is switched off. Consequently, the first sample-and-hold circuit 200 samples the reference signal. The reference signal held in the capacitor Ccom is analog-to-digitally converted by the AD converter circuit ADC via the differential amplifier AMP. The difference between the analog-to-digitally converted reference signal and pixel signal is obtained, whereby the true pixel signal can be obtained.

In this manner, by using the same capacitor Ccom, the sampling of the pixel signal, the AD conversion of the pixel signal, the sampling of the reference signal, and the AD conversion of the reference signal are sequentially implemented, in the present embodiment.

According to the present embodiment, an effect similar to that exhibited by the imaging devices in Embodiments 1 and 2 can be obtained. Further, use of the same capacitor for holding the pixel signal and the reference signal can reduce the imaging device in size.

Embodiment 4

An imaging module 2000 according to the present embodiment will be described with reference to FIG. 13.

Figure 13:
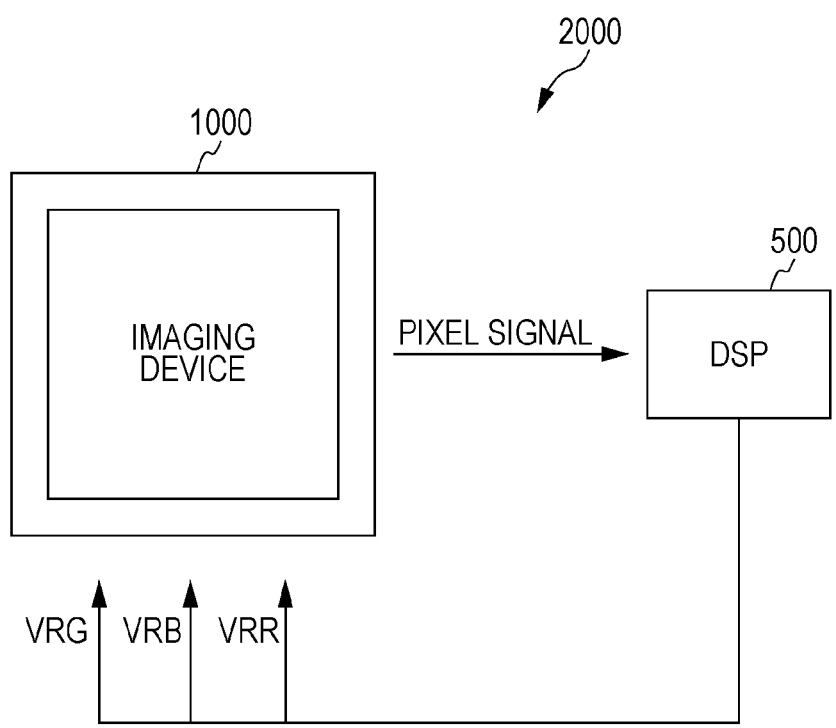
FIG. 13 is a schematic view illustrating a functional block of an imaging module including any of the imaging devices of the present disclosure, according to an exemplary Embodiment 4.

FIG. 13 schematically illustrates a functional block of the imaging module 2000 including any of the imaging devices of the present disclosure.

The imaging module 2000 includes the imaging device 1000 according to Embodiment 1 and a digital signal processor (DSP) 500, for example. In the imaging module 2000, a signal obtained by the imaging device 1000 is processed and output externally.

The DSP 500 functions as a signal processing circuit that processes a signal output from the imaging device 1000. The DSP 500 receives a digital pixel signal output from the imaging device 1000, and performs gamma correction, color interpolation, spatial interpolation, and auto white balance, for example. A microcomputer may have the function of the DSP 500, the microcomputer controlling the imaging device 1000 based on various settings designated by a user and integrating the entire operation of the imaging module 2000.

The DSP 500 processes the digital pixel signal output from the imaging device 1000, calculates appropriate reset voltage VRG, reset voltage VRB, and reset voltage VRR, and feeds these reset voltages back to the imaging device 1000. The reset voltage VRG, the reset voltage VRB, and the reset voltage VRR denote the reset voltage for a G pixel, the reset voltage for a B pixel, and the reset voltage for an R pixel, respectively. The imaging device 1000 and the DSP 500 can be formed into one semiconductor device. The semiconductor device is what is called a system-on-a-chip (SoC). This configuration can reduce the size of electronic equipment using the imaging device 1000.

The imaging devices according to the present disclosure can be applied to various cameral systems such as digital still cameras, medical cameras, monitoring cameras, vehicle-mounted cameras, digital single-lens reflex cameras, and mirrorless single-lens digital cameras, as well as sensor systems.

What is claimed is:

1. An imaging device comprising:
a pixel including a photoelectric converter that generates signal charge by photoelectric conversion, and a charge accumulation region that accumulates the signal charge, the pixel being configured to output a signal corresponding to a voltage of the charge accumulation region;
a signal line electrically connected to the pixel, the signal being transmitted through the signal line;
a first switch that is electrically connected to the signal line and that has input-output characteristics in which an output is linear with respect to an input up to a clipping voltage and the output is clipped at the clipping voltage with respect to the input exceeding the clipping voltage; and
a second switch that is electrically connected to the signal line and that has input-output characteristics in which an output is linear with respect to an input.

2. The imaging device according to claim 1, further comprising:
a control circuit, wherein
the pixel outputs a reference signal corresponding to a reset voltage and a pixel signal corresponding to a voltage of the charge accumulation region at a time when the signal charge is accumulated in the charge accumulation region, to the signal line, and
the control circuit switches the first switch on when the pixel outputs the reference signal, and switches the second switch on when the pixel outputs the pixel signal.

3. The imaging device according to claim 1, wherein
the first switch includes a first transistor having a first conductive type, and
the second switch includes a second transistor having the first conductive type, and a third transistor electrically connected with the second transistor in parallel and having a second conductive type different from the first conductive type.

4. The imaging device according to claim 3, wherein
the first transistor is a MOS transistor, and
when a power supply voltage is applied to a gate of the first transistor, the clipping voltage has a value obtained by subtracting a threshold voltage of the first transistor from the power supply voltage.

5. The imaging device according to claim 3, further comprising:
a step-down circuit that steps down a power supply voltage to generate a stepped-down voltage, wherein
the step-down circuit applies the stepped-down voltage to a gate of the first transistor, and
the first transistor is a MOS transistor.

6. The imaging device according to claim 5, wherein when the stepped-down voltage is applied to the gate of the first transistor, the clipping voltage has a value obtained by subtracting a threshold voltage of the first transistor from the stepped-down voltage.

7. The imaging device according to claim 3, wherein
the signal charge is a hole, and
the first transistor having the first conductive type is an n-type MOS transistor.

8. The imaging device according to claim 1, wherein
the first switch includes an enhancement-type transistor, and
the second switch includes a depletion-type transistor.

9. The imaging device according to claim 8, wherein a conductive type of the enhancement-type transistor is the same as a conductive type of the depletion-type transistor.

10. The imaging device according to claim 1, further comprising:
a first capacitor electrically connected to the signal line through the first switch;
a second capacitor electrically connected to the signal line through the second switch; and
a differential amplifier electrically connected with the first capacitor and the second capacitor, wherein
the differential amplifier outputs a difference between a voltage held in the first capacitor and a voltage held in the second capacitor.

11. The imaging device according to claim 10, further comprising:
an AD conversion circuit that converts an output of the differential amplifier from an analog signal into a digital signal.

12. The imaging device according to claim 11, wherein
the pixel outputs a pixel signal corresponding to a voltage of the charge accumulation region at a time when the signal charge is accumulated in the charge accumulation region, to the signal line, and
a value obtained by subtracting the clipping voltage from a maximum value of the pixel signal is larger than a maximum value of an input voltage range of the AD conversion circuit.

13. The imaging device according to claim 1, wherein the photoelectric converter includes:
a first electrode,
a second electrode facing the first electrode, and
a photoelectric conversion film that is located between the first electrode and the second electrode and that generates the signal charge by the photoelectric conversion.

14. The imaging device according to claim 1, wherein the photoelectric converter is a photodiode.

15. The imaging device according to claim 14, wherein the pixel includes a transfer transistor between the photoelectric converter and the charge accumulation region.

16. An imaging device comprising:
a pixel including a photoelectric converter that generates signal charge by photoelectric conversion, and a charge accumulation region that accumulates the signal charge, the pixel being configured to output a signal corresponding to a voltage of the charge accumulation region;
a signal line electrically connected to the pixel, the signal being transmitted through the signal line;
a first switch that is electrically connected to the signal line and that includes a first transistor having a first conductive type; and
a second switch that is electrically connected to the signal line and that includes a second transistor having the first conductive type, and a third transistor electrically connected with the second transistor in parallel and having a second conductive type different from the first conductive type,
wherein an output of the first switch is linear with respect to an input of the first switch up to a clipping voltage after which the output is clipped at the clipping voltage.

17. The imaging device according to claim 16, further comprising:
a control circuit, wherein
the pixel outputs a reference signal corresponding to a reset voltage and a pixel signal corresponding to a voltage of the charge accumulation region at a time when the signal charge is accumulated in the charge accumulation region, to the signal line, and
the control circuit switches the first switch on when the pixel outputs the reference signal, and switches the second switch on when the pixel outputs the pixel signal.

18. An imaging device comprising:
a pixel including a photoelectric converter that generates signal charge by photoelectric conversion, and a charge accumulation region that accumulates the signal charge, the pixel being configured to output a signal corresponding to a voltage of the charge accumulation region;
a signal line electrically connected to the pixel, the signal being transmitted through the signal line;
a first switch that is electrically connected to the signal line and that includes an enhancement-type transistor; and
a second switch that is electrically connected to the signal line and that includes a depletion-type transistor,
wherein a conductive type of the enhancement-type transistor is the same as a conductive type of the depletion-type transistor.

19. The imaging device according to claim 18, further comprising:
a control circuit, wherein
the pixel outputs a reference signal corresponding to a reset voltage and a pixel signal corresponding to a voltage of the charge accumulation region at a time when the signal charge is accumulated in the charge accumulation region, to the signal line, and
the control circuit switches the first switch on when the pixel outputs the reference signal, and switches the second switch on when the pixel outputs the pixel signal.

20. The imaging device according to claim 16, wherein the first switch has input-output characteristics in which the output is linear with respect to the input up to the clipping voltage and the output is clipped at the clipping voltage with respect to the input exceeding the clipping voltage.

* * * * *